(12) United States Patent
Hsu (10) Patent No.: US 8,260,895 B2
(45) Date of Patent: Sep. 4, 2012

(54) COMPUTER AND MAIN CIRCUIT BOARD THEREOF

(75) Inventor: Yu-Wei Hsu, Taipei (TW)

(73) Assignee: ASUSTek Computer, Taipei (TW)

( * ) Notice: Subject to any disclaimer, the term of this patent is extended or adjusted under 35 U.S.C. 154(b) by 665 days.

(21) Appl. No.: 11/806,706

(22) Filed: Jun. 4, 2007

(65) Prior Publication Data

US 2007/0286229 A1 Dec. 13, 2007

(30) Foreign Application Priority Data

Jun. 9, 2006 (TW) .............................. 95120687 A (51) Int. Cl.
 *G06F 15/173* (2006.01)
 *G06F 15/16* (2006.01)

(52) U.S. Cl. ........................................ 709/223; 709/227

(58) Field of Classification Search ................... 709/223, 709/227
 See application file for complete search history.

(56) References Cited

U.S. PATENT DOCUMENTS

| | | | | |
|---|---|---|---|---|
| 7,444,396 B2 * | 10/2008 | King et al. | ..................... | 709/223 |
| 2001/0037397 A1 * | 11/2001 | Boucher et al. | ............... | 709/230 |
| 2003/0009281 A1 * | 1/2003 | Whitham | ...................... | 701/211 |
| 2004/0006716 A1 * | 1/2004 | Schuckle et al. | ............... | 713/300 |
| 2005/0050205 A1 * | 3/2005 | Gordy et al. | .................... | 709/227 |
| 2006/0106931 A1 * | 5/2006 | Richoux | ........................ | 709/226 |
| 2007/0006021 A1 * | 1/2007 | Nicholson et al. | ................ | 714/6 |
| 2007/0032100 A1 * | 2/2007 | Yang et al. | ........................ | 439/43 |
| 2007/0174589 A1 * | 7/2007 | Kamhi et al. | .................. | 712/214 |
| 2008/0109879 A1 * | 5/2008 | Bhagwat et al. | .................. | 726/3 |
| 2008/0244149 A1 * | 10/2008 | Chu | .............................. | 710/313 |
| 2009/0144568 A1 * | 6/2009 | Fung | ............................ | 713/300 |
| 2010/0223395 A1 * | 9/2010 | Elliot et al. | ................... | 709/232 |

* cited by examiner

*Primary Examiner* — Karen Tang (57) ABSTRACT

A computer system and a main circuit board thereof are provided. The computer system includes a main circuit board. The main circuit board includes a main system chip module, a south bridge chip module, a HUB chip module, a first LAN port and a second LAN port. The main system chip module, the south bridge chip module, the HUB chip module, the first LAN port and the Internet are connected to form a first signal path. The main system chip module, the south bridge chip module, the HUB chip module, the second LAN port and an outside computer are connected to form a second signal path. The outside computer, the second LAN port, the HUB chip module, the first LAN port and the Internet are connected to form a third signal path.

9 Claims, 6 Drawing Sheets

COMPUTER AND MAIN CIRCUIT BOARD THEREOF

This application claims the benefit of Taiwan application Serial No. 095120687, filed Jun. 9, 2006, the subject matter of which is incorporated herein by reference.

BACKGROUND OF THE INVENTION

1. Field of the Invention

The invention relates in general to a computer system and a main circuit board thereof, and more particularly to a computer system with built-in HUB chip module and a main circuit board thereof.

2. Description of the Related Art

Along with the advance in technology, computers are now widely used in peoples' everyday life. A household or a business may have multiple computers. The applications of computers include desktop computer, notebook, server and multifunction peripheral. Computers can be connected to an Internet to receive and transmit information. Or, computers can be connected to each other to share resources. As for how a conventional computer gets access to the Internet and shares resources with other computers, is elaborated below.

Figure 1:
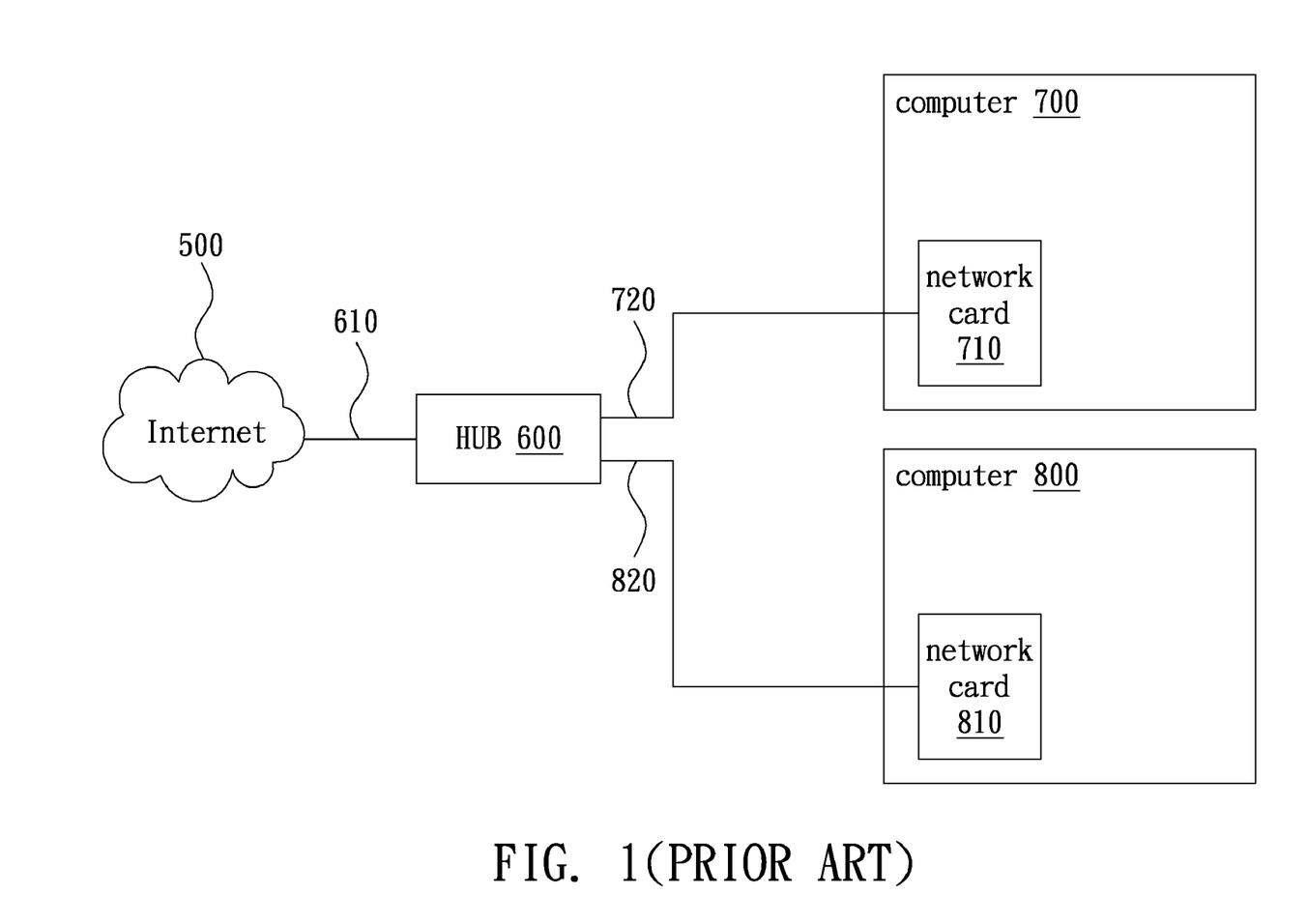
FIG. 1 (Prior Art) is a perspective of a conventional computer connected to the Internet.

Referring to FIG. 1, a perspective of a conventional computer connected to the Internet is shown. Let a conventional computer 700 be taken for example. The conventional computer 700 includes a network card 710 in order to get access to the Internet. The network card 710 is connected to the Internet 500 such that the conventional computer 700 can get access to the Internet.

If the computer 700 and the computer 800 want to get access to the Internet at the same time, a non-jumped network line 720 is used to connect the network card 710 of the computer 700 to a HUB 600, and a non-jumped network line 820 is used to connect a network card 810 of the computer 800 to the HUB 600. The other non-jumped network line 610 connects the HUB 600 to the Internet 500, such that the computer 700 and the computer 800 can get access to the Internet at the same time. More than three computers still can get connected to the Internet in the same way. That is, the network card of each computer is connected to the HUB via a non-jumped network line, such that multiple computers can get access to the Internet at the same time.

However, no matter where is each conventional computer disposed, the each conventional computer needs to be connected to the HUB 600 via a lengthy non-jumped network line, bringing considerable trouble to the user. Besides, as the network line of the HUB 600 only has a limited number of ports, if there are more computers than the ports of the network line of the HUB, the user has to buy an additional HUB to meet actual needs.

Figure 2:
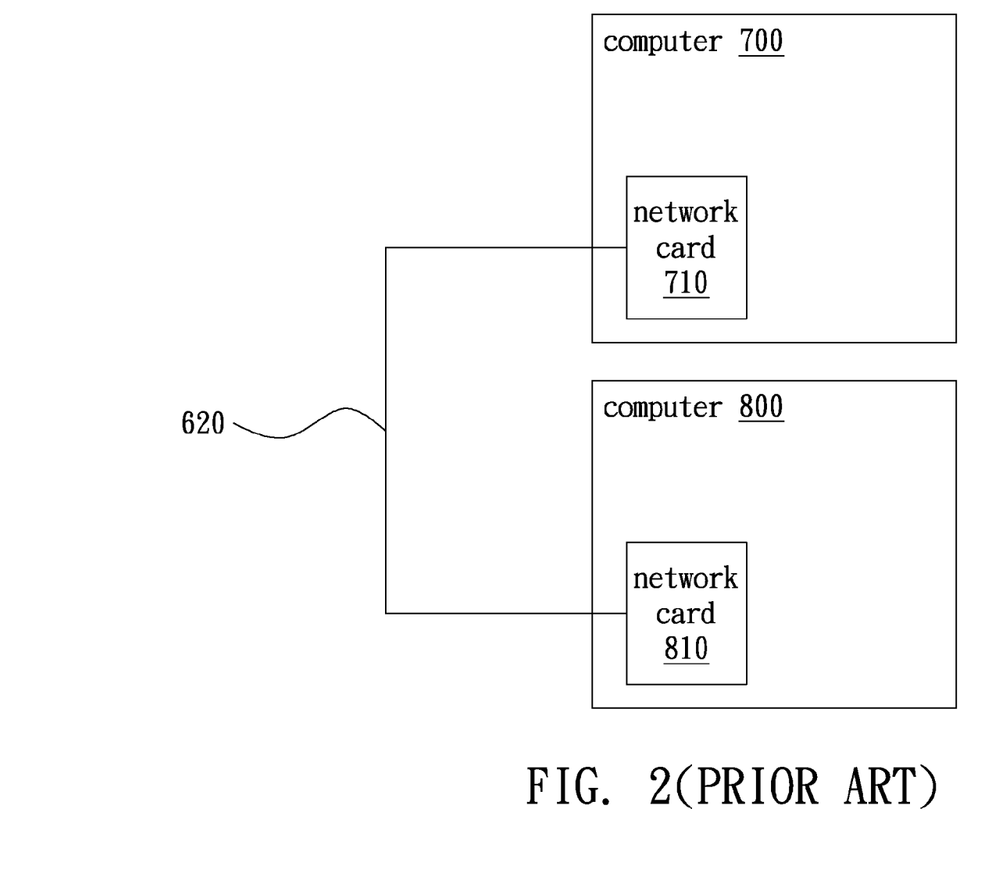
FIG. 2 (Prior Art) is a perspective of two conventional computers sharing resources.

Referring to FIG. 2, a perspective of two conventional computers sharing resources is shown. If the computer 700 and the computer 800 are to share resources, the user may connect the network card 710 and the network card 810 via a jumped network line 620, such that the computer 700 and the computer 800 are connected to share data.

However, the user has to connect the computer 700 and the computer 800 via a jumped network line 620 and is unable to connect the computer 700 and the computer 800 via a non-jumped network line. The jumped network line 620 is not as popular and available as the non-jumped network line, and can only connect two computers on a one-to-one basis, and can not be augmented to connect multiple computers. Further, when the computer 700 and the computer 800 are mutually connected to share resources, the two computers can not get access to the Internet at the same time, causing great inconvenience to the user.

The above problems can occur to any computers that need to get access to the Internet and exchange data with other computers. Therefore, how to develop a computer system capable of getting access to the Internet and share resources with other computer devices at the same time has become an important focus of research and development.

SUMMARY OF THE INVENTION

The invention is directed to a computer system and a main circuit board thereof. A HUB chip module is disposed the main circuit board. The computer system gets access to the Internet via a first signal path and shares resources with an outside computer via a second signal path. The outside computer can further get access to the Internet via a third signal path, such that multiple outside computers can get access to the Internet and share resources at the same time without using an additional jumped network line or HUB, which is very convenient to the user.

According to a first aspect of the present invention, a computer system is provided. The computer system includes a main circuit board. The main circuit board includes a main system chip module, a south bridge chip module, a HUB chip module, a first LAN port and a second LAN port. The south bridge chip module is electrically connected to the main system chip module. The HUB chip module is electrically connected to the south bridge chip module. One end of the first LAN port is electrically connected to the HUB chip module, and the other end is electrically connected to an Internet. One end of the second LAN port is electrically connected to the HUB chip module, and the other end is electrically connected to an outside computer. The main system chip module, the south bridge chip module, the HUB chip module, the first LAN port and the Internet are connected to form a first signal path. The main system chip module, the south bridge chip module, the HUB chip module, the second LAN port and the outside computer are connected to form a second signal path. The outside computer, the second LAN port, the HUB chip module, the first LAN port and the Internet are connected to form a third signal path.

According to a second aspect of the present invention, a main circuit board disposed in a computer system is provided. The main circuit board includes a main system chip module, a south bridge chip module, a HUB chip module, a first LAN port and a second LAN port. The south bridge chip module is electrically connected to the main system chip module. The HUB chip module is electrically connected to the south bridge chip module. One end of the first LAN port is electrically connected to the HUB chip module, and the other end is electrically connected to an Internet. One end of the second LAN port is electrically connected to the HUB chip module, and the other end is electrically connected to an outside computer. The main system chip module, the south bridge chip module, the HUB chip module, the first LAN port and the Internet are connected to form a first signal path. The main system chip module, the south bridge chip module, the HUB chip module, the second LAN port and the outside computer are connected to form a second signal path. The outside computer, the second LAN port, the HUB chip module, the first LAN port and the Internet are connected to form a third signal path.

The invention will become apparent from the following detailed description of the preferred but non-limiting embodiments. The following description is made with reference to the accompanying drawings.

DETAILED DESCRIPTION OF THE INVENTION

Figure 3:
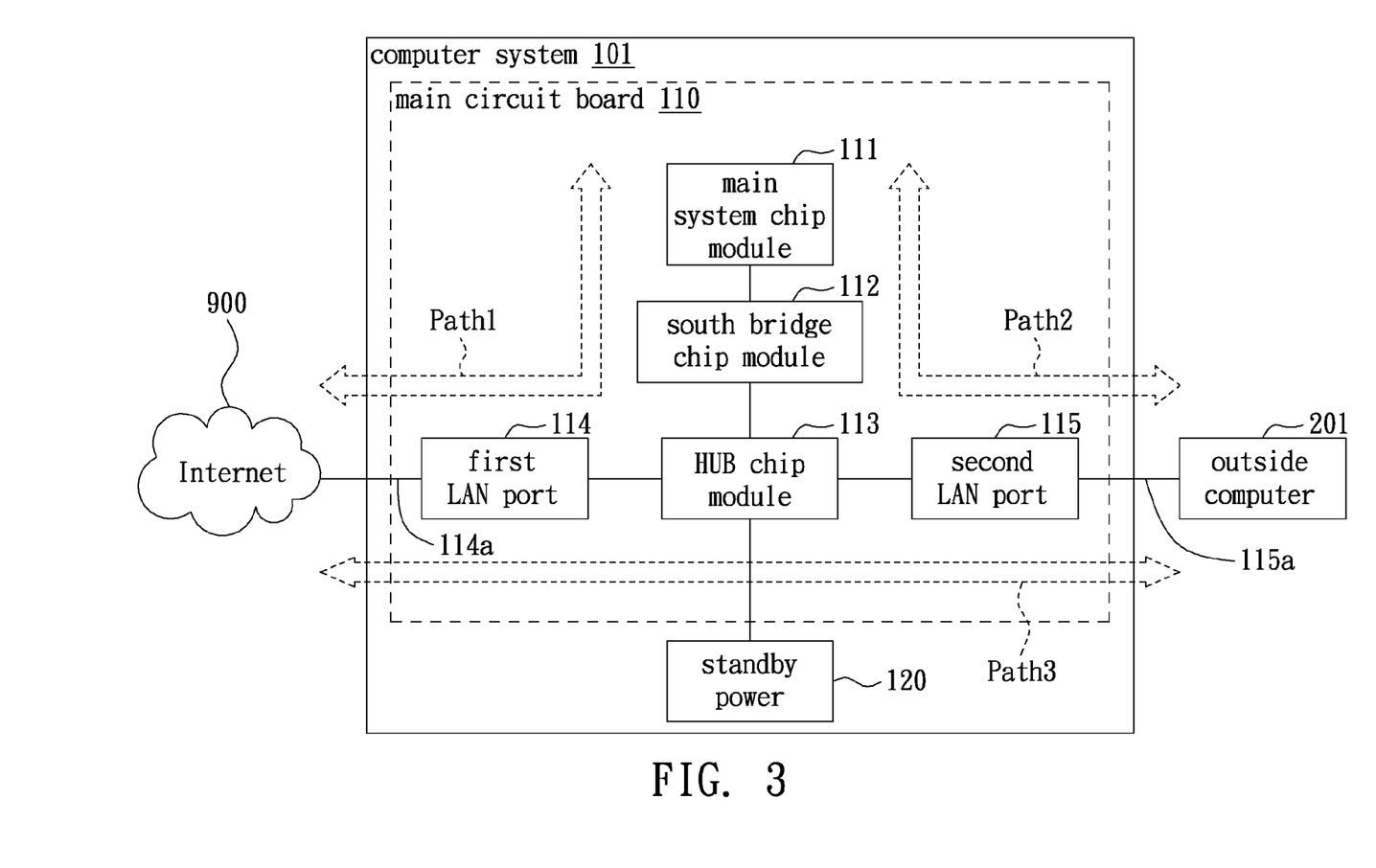
FIG. 3 is a perspective of a computer system according to an embodiment of the invention.

Referring to FIG. 3, a perspective of a computer system according to an embodiment of the invention is shown. Examples of the computer system 101 include a quasi-system computer, a notebook, a multifunction peripheral and a server. The types of the computer system 101 are not for limiting the technology of the invention. The computer system 101 includes a main circuit board 110.

The main circuit board 110 includes a main system chip module 111, a south bridge chip module 112, a HUB chip module 113, a first local area network (LAN) port 114 and a second LAN port 115. The main system chip module 111 can be a combination of a number of controlling chips and processing chips or a center process unit (CPU) chip and is used for processing various electrical signals. The main system chip module 111 is electrically connected to the south bridge chip module 112. The south bridge chip module 112 can be a combination of a number of controlling chips and processing chips. The south bridge chip module 112 receives the electrical signals transmitted from the main system chip module 111 so as to communicate with peripheral electronic components. In the present embodiment of the invention, the south bridge chip module 112 passes the commands sent to the HUB chip module 113 by the main system chip module 111, and controls the actions of the HUB chip module 113. The HUB chip module 113 is used as a transmission interface between multiple computers and an Internet or as a transmission interface connecting multiple computers. Preferably, the HUB chip module 113 of the present embodiment of the invention is a switching HUB chip module capable of improving the efficiency of the frequency width of the network. The HUB chip module 113 is electrically connected to the Internet 900 via the first LAN port 114 and the first network line 114a. The first network line 114a is a non-jumped network line.

The main system chip module 111, the south bridge chip module 112, the HUB chip module 113, the first LAN port 114, the first network line 114a and the Internet 900 are connected to form a first signal path Path1, wherein signals are transmitted between the main system chip module 111 and the Internet 900 via the first signal path Path1, such that the computer system 101 can get access to the Internet.

On the other hand, the HUB chip module 113 is electrically connected to an outside computer 201 via the second LAN port 115 and a second network line 115a. The second network line 115a is a non-jumped network line. The main system chip module 111, the south bridge chip module 112, the HUB chip module 113, the second LAN port 115, the second network line 115a and the outside computer 201 are connected to form a second signal path Path2, wherein signals are transmitted between the main system chip module 111 and the outside computer 201 via the second signal path Path2, such that the outside computer 201 can share resources with the computer system 101.

Besides, the outside computer 201, the second network line 115a, the second LAN port 115, the HUB chip module 113, the first LAN port 114, the first network line 114a and the Internet 900 are connected to form a third signal path Path3, wherein signals are transmitted between the outside computer 201 and the Internet 900 via the third signal path Path3, such that the outside computer 201 can get access to the Internet via the computer system 101.

Preferably, the computer system 101 further includes a standby power 120. When the computer system 101 is shut down, the standby power 120 provides a power to the HUB chip module 113 for enabling the outside computer 201 to transmit data via the third signal path Path3, such that the outside computer 201 can get access to the Internet via the computer system 101.

Figure 4:
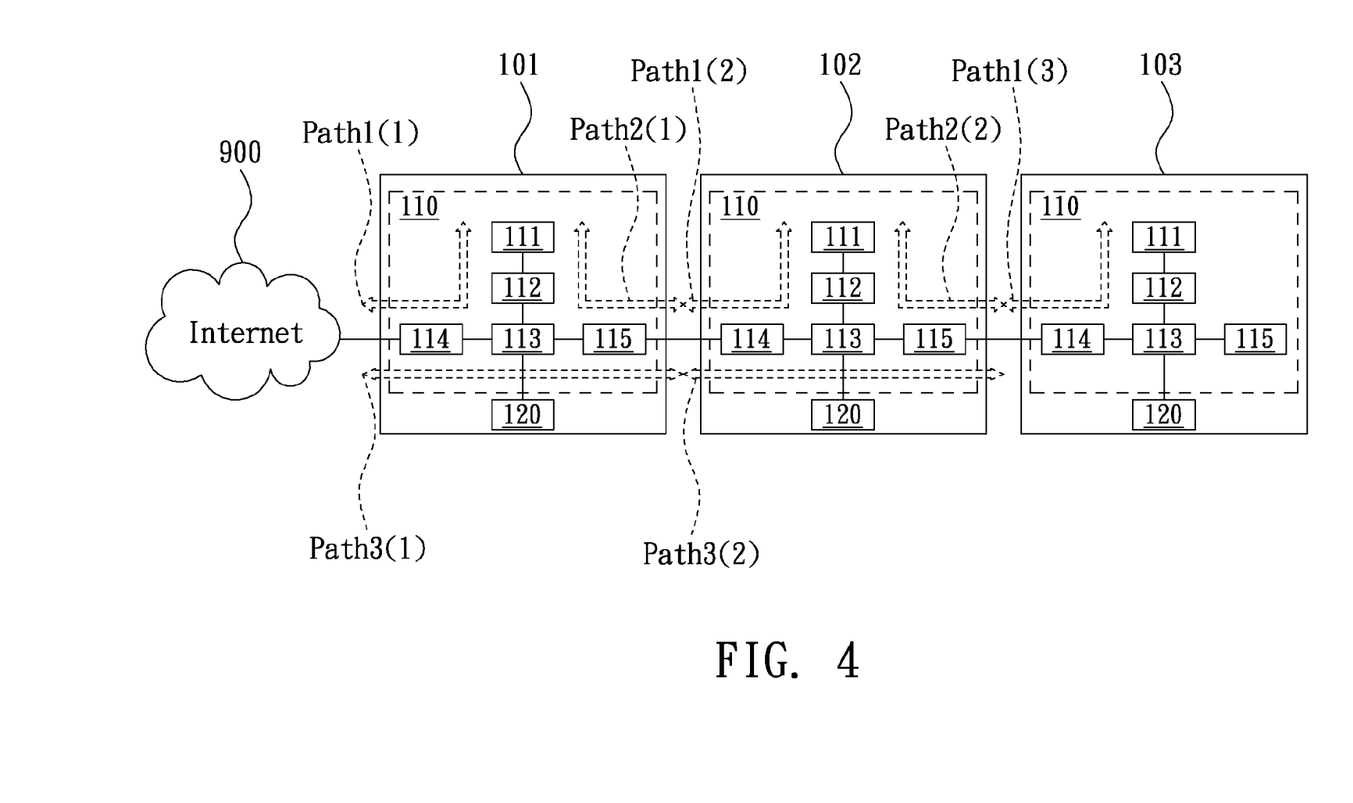
FIG. 4 is a perspective multiple computer systems connected in serial.

Referring to FIG. 4, a perspective multiple computer systems connected in serial is shown. The computer system 101, the computer system 102 and the computer system 103 all have the main circuit board 110 and the HUB chip module 113 thereof. The computer system 101, the computer system 102 and the computer system 103 can be serially connected to the Internet 900 via a network line, such that the computer system 101 can get access to the Internet via a first signal path Path1 (1). The computer system 102 can get access to the Internet through the computer system 101 via a first signal path Path1 (2) and a third signal path Path3 (1). Similarly, the computer system 103 can get access to the Internet through the computer system 101 and the computer system 102 via a first signal path Path1 (3), a third signal path Path3 (2) and the third signal path Path3 (1). Through the above serial connection, the computer system 101, the computer system 102 and the computer system 103 are connected to get access to the Internet at the same time without using an additional HUB.

On the other hand, the computer system 101 and the computer system 102 can share resources via a second signal path Path2 (1) and a first signal path Path1 (2). The computer system 102 and the computer system 103 can share resources via a second signal path Path2 (2) and the first signal path Path1 (3). The computer system 101 and the computer system 103 can share resources via the second signal path Path2 (1), the third signal path Path3 (2) and the first signal path Path1 (3). Through the above serial connection, the computer system 101, the computer system 102 and the computer system 103 are connected to share resources at the same time without using an additional HUB and jumped network line.

Similarly, multiple computers systems can be connected in serial, such that each of the computer systems can get access to the Internet, and any two computers can share resources. When any of the computer systems is shut down, the remaining computers can still function properly.

Figure 5:
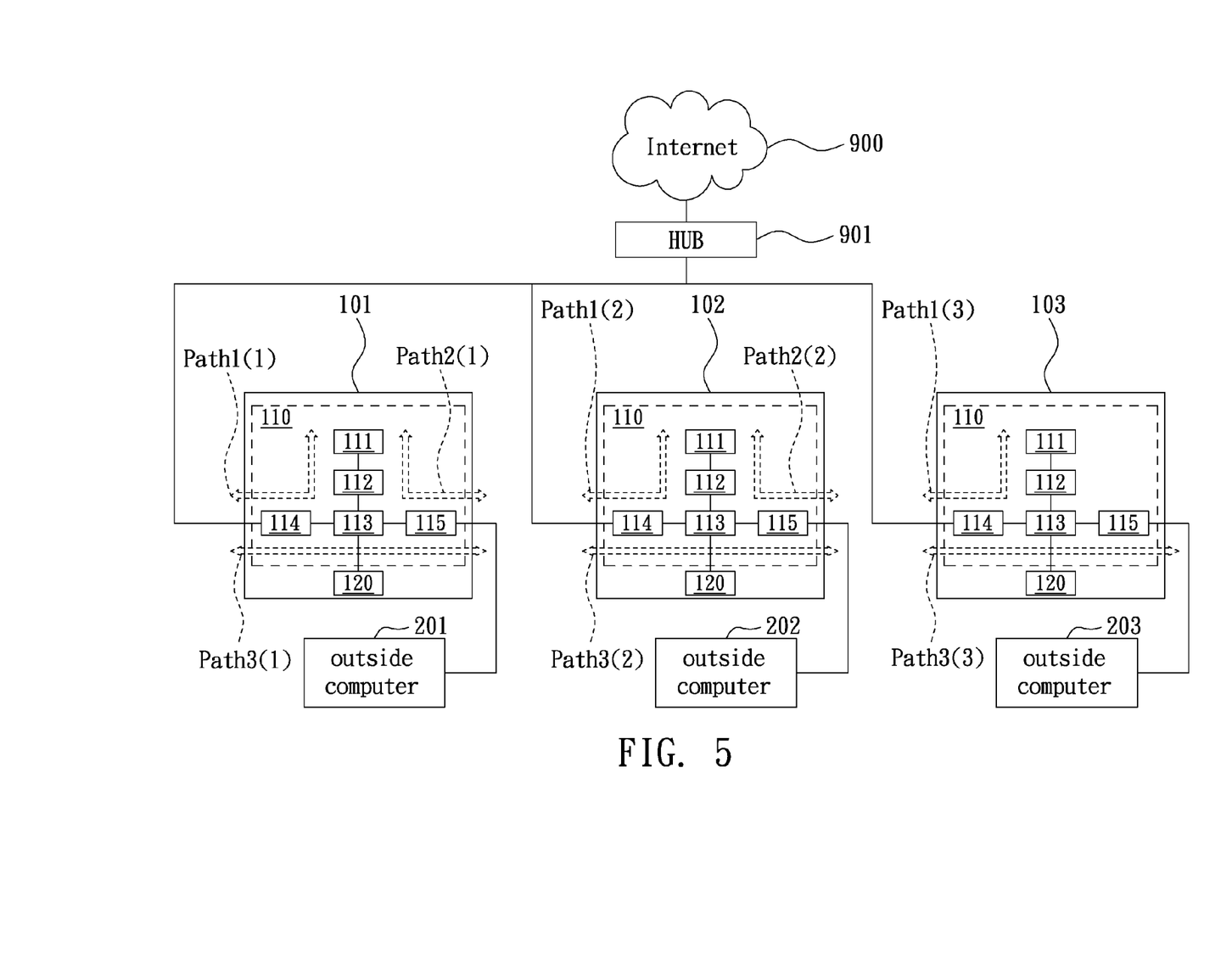
FIG. 5 is a perspective multiple computer systems connected in parallel.

Referring to FIG. 5, a perspective multiple computer systems connected in parallel is shown. The computer system 101, the computer system 102 and the computer system 103 can be connected in parallel to a HUB 901 and an Internet 900 via a network line, such that the computer system 101 can get access to the Internet via the first signal path Path1 (1). The computer system 102 can get access to the Internet via the first signal path Path1 (2). Similarly, the computer system 103 can get access to the Internet via the first signal path Path1 (3). Through the above serial connection, the computer system 101, the computer system 102 and the computer system 103 are connected to get access to the Internet at the same time.

Besides, the outside computer 201 and the computer system 101 are connected in serial. The outside computer 201 can get access to the Internet through the computer system 101 via the third signal path Path3 (1) and the first signal path Path1 (1). The outside computer 201 and the computer system 101 can further share resources via the second signal path Path2 (1).

Similarly, the outside computer 202 is serially connected to the computer system 102, such that the outside computer 202 can get access to the Internet via the computer system 102. Further, the computer system 102 and the outside computer 202 can share resources. The outside computer 203 is serially connected to the computer system 103, such that the outside computer 203 can get access to the Internet via the computer system 103. Further, the computer system 103 and the outside computer 203 can share resources.

Figure 6:
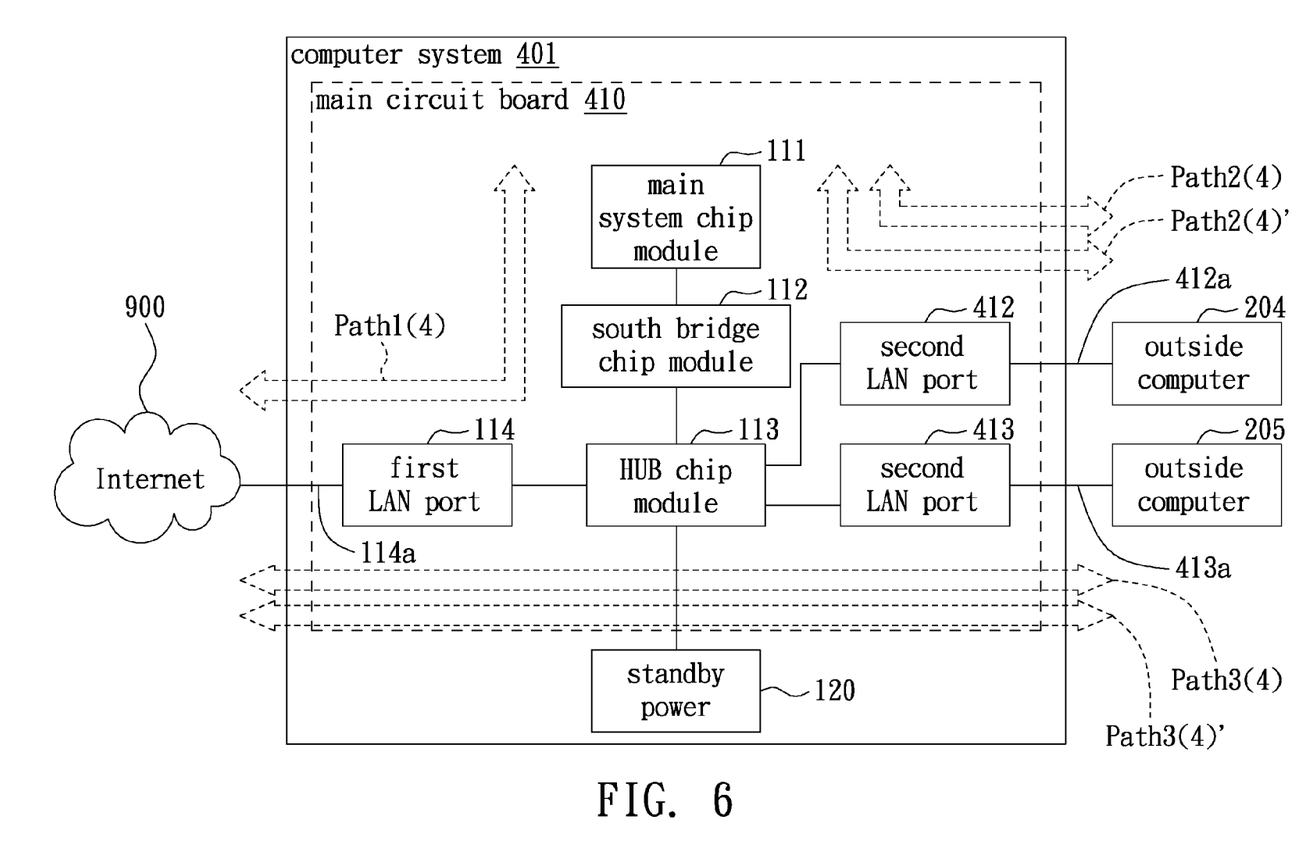
FIG. 6 is a perspective of a computer system according to another embodiment of the invention.

Referring to FIG. 6, a perspective of a computer system according to another embodiment of the invention is shown. The computer system 401 of the present embodiment of the invention differs with the computer system 101 of the above embodiment in the number of second LAN ports. As for other similarities, the same numeric designations are used and are not repeated here.

In the present embodiment of the invention, the main circuit board 410 includes a second LAN port 412 and a second LAN port 413. The HUB chip module 113 is electrically connected to an outside computer 204 via a second LAN port 412 and a second network line 412a. A second signal path Path2 (4) is formed along the main system chip module 111, the south bridge chip module 112, the HUB chip module 113, the second LAN port 412, the second network line 412a and the outside computer 204. Signals are transmitted between the main system chip module 111 and the outside computer 402 via the second signal path Path2 (4), such that the outside computer 204 and the computer system 401 can share resources.

A second signal path Path2 (4)' is formed along the main system chip module 111, the south bridge chip module 112, the HUB chip module 113, the second LAN port 413, the second network line 413a and the outside computer 205. Signals are transmitted between the main system chip module 111 and the outside computer 205 via the second signal path Path2 (4)', such that the outside computer 205 and the computer system 401 can share resources.

A third signal path Path3 (4) is formed along the outside computer 204, the second network line 412a, the second LAN port 412, the HUB chip module 113, the first LAN port 114, the first network line 114a and the Internet 900. Signals are transmitted between the outside computer 204 and the Internet 900 via the third signal path Path3 (4), such that the outside computer 204 can get access to the Internet via computer system 401.

A third signal path Path3 (4)' is formed along the outside computer 205, the second network line 413a, the second LAN port 413, the HUB chip module 113, the first LAN port 114, the first network line 114a and the Internet 900. Signals are transmitted between the outside computer 205 and the Internet 900 via the third signal path Path3 (4)', such that the outside computer 205 can get access to the Internet via the computer system 401.

According to the computer system and the main circuit board thereof disclosed in the above embodiments of the invention, a HUB chip module is disposed on the main circuit board. The computer system can get access to the Internet via a first signal path and share resources with an outside computer via a second signal path. The outside computer can further get access to the Internet through the computer system via a third signal path. Beside the above advantages, the computer system and the outside computer further have the following advantages:

Firstly, when a computer system or an outside computer is to get access to the Internet, the computer system does not need to go through complicated setting procedure and can do without a driver. The computer system can be connected to a network point via a network line to get access to the Internet, and the outside computer can be connected to the computer system via a network line to get access to the Internet via the computer system.

Secondly, the computer system can be connected to a nearest network point via a network line, and the other computer system or the outside computer can use the computer system already connected to the Internet as a network point and does not need to be connected to a conventional HUB via a lengthy network line, not only reducing the length of the network line but further making it easier and more flexible to erect a network.

Thirdly, the computer system can be connected to the outside computer or the other computer system to share resources via an ordinary non-jumped network line. There is no need to use the rare jumped network line, saving the user troubles of preparing and bringing the jumped network line.

Fourthly, multiple computer systems can be connected in serial to share resources. Compared with the conventional computer which can only share resources on a one-to-one basis, the invention is not limited to the number of computers and can be used conveniently.

Fifthly, the built-in HUB chip module costs less and the user can save the cost for the HUB.

Sixthly, the HUB chip module of the computer system can still be in service even after the computer system is shut down, such that the outside computer and the other computer system still can function properly via the computer system though has been shut down already, which is very convenient.

Seventhly, multiple outside computers can get access to the Internet and share resources at the same time without using an additional jumped network line or HUB, which is very convenient to the user While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer device, comprising:
 a main circuit board, comprising:
  a main system chip circuit;
  a south bridge chip circuit electrically connected to the main system chip circuit;
  a HUB chip circuit electrically connected to the south bridge chip circuit;
  a first local area network (LAN) Port whose one end is electrically connected to the HUB chip circuit and the other end is electrically connected to an Internet; and
  a second LAN port whose one end is electrically connected to the HUB chip circuit and the other end is electrically connected to an outside computer, wherein the HUB chip circuit is an Ethernet HUB chip circuit, and the outside computer gets access to the Internet through the Ethernet HUB chip circuit; and a standby power electrically connected to the HUB chip circuit;

wherein, the main system chip circuit, the south bridge chip circuit, the HUB chip circuit, the first LAN port and the Internet are connected to form a first signal path; the main system chip circuit, the south bridge chip circuit, the HUB chip circuit, the second LAN port and the outside computer are connected to form a second signal path; the outside computer, the second LAN port, the HUB chip circuit, the first LAN port and the Internet are connected serially to form a third signal path concurrent with the first signal path to the Internet by the HUB chip circuit;

wherein when the computer device is shut down, the standby power supplies a power to the HUB chip circuit such that the outside computer is capable of accessing the Internet via the third signal path.

2. The computer device according to claim 1, wherein the HUB chip circuit is a switching HUB chip circuit.

3. The computer device according to claim 1, wherein the main system chip circuit is a center process unit (CPU) chip.

4. The computer device according to claim 1, wherein the computer device is a notebook or a desktop computer, a multifunction peripheral or a server.

5. A system comprising:

a first computer device and a second computer device, each of the first computer device and the second computer device comprising:

a main system chip circuit;

a south bridge chip circuit electrically connected to the main system chip circuit;

a HUB chip circuit electrically connected to the south bridge chip circuit;

a first LAN port whose one end is electrically connected to the HUB chip circuit; and a second LAN port whose one end is electrically connected to the HUB chip circuit, wherein the first LAN port of the first computer device is electrically connected to an Internet, and the second LAN port of the first computer device is electrically connected to the first LAN port of the second computer device;

wherein, the main system chip circuit, the south bridge chip circuit, the HUB chip circuit, and the first LAN port of the first computer device and the Internet are connected to form a first signal path; the main system chip circuit, the south bridge chip circuit, the HUB chip circuit, and the second LAN port of the first computer device and the first LAN port of the second computer device are connected to form a second signal path; the first LAN port of the second computer device, the second LAN port, the HUB chip circuit, and the first LAN port of the first computer device and the Internet are connected serially to form a third signal path, the main system chip circuit, the south bridge chip circuit, the HUB chip circuit and the first LAN port of the second computer device and the second LAN port of the first computer device are connected to form a fourth signal path, and the second computer device gets access to the Internet through the first computer device via the fourth signal path and the third signal path.

6. The computer system according to claim 5, wherein the HUB chip circuit is a switching HUB chip circuit.

7. The computer system according to claim 5, wherein each of the computer devices further comprises:

a standby power used for providing a power to the HUB chip circuit, wherein when one of the computer devices is shut down, the other computer device is capable of accessing the Internet via the third signal path of the shut-down computer device.

8. The computer system according to claim 5, wherein the main system chip circuit is a center process unit (CPU) chip.

9. The computer system according to claim 5, wherein each of the computer devices is a notebook, a desktop computer, a multifunction peripheral or a server.

* * * * *